United States Patent [19]
Konshak

[11] Patent Number: 6,072,766
[45] Date of Patent: *Jun. 6, 2000

[54] APPARATUS AND ASSOCIATED METHOD FOR STORING, RETRIEVING, AND MANIPULATING COMPUTER, MASS-STORAGE MEDIA ELEMENTS

[75] Inventor: Michael V. Konshak, Louisville, Colo.

[73] Assignee: Storage Technology Corporation, Louisville, Colo.

[*] Notice: This patent is subject to a terminal disclaimer.

[21] Appl. No.: 08/142,502

[22] Filed: Oct. 22, 1993

[51] Int. Cl.$^7$ .................................................. G11B 17/04
[52] U.S. Cl. .......................................................... 369/192
[58] Field of Search ...................................... 369/191, 192, 369/34, 36; 360/98.06, 98.04, 98.01, 91, 92, 34, 36; D14/109; 361/685, 826–829; 211/1.52, 1.53, 1.55, 163

[56] References Cited

U.S. PATENT DOCUMENTS

| | | | |
|---|---|---|---|
| 4,275,425 | 6/1981 | Watanabe et al. | 360/92 |
| 4,654,727 | 3/1987 | Blum et al. | 360/71 |
| 4,907,889 | 3/1990 | Simone | 360/92 |
| 4,937,690 | 6/1990 | Yamashita et al. | 360/92 |
| 5,088,604 | 2/1992 | Baur et al. | 211/1.55 |
| 5,218,583 | 6/1993 | Miyajima | 369/36 |
| 5,285,333 | 2/1994 | Barr et al. | 369/192 |

FOREIGN PATENT DOCUMENTS

3259450 11/1991 Japan .

*Primary Examiner*—Allen T. Cao
*Attorney, Agent, or Firm*—Brooks & Kushman P.C.

[57] ABSTRACT

A computer mass-storage media element storage, retrieval, and manipulative apparatus and associated method uses media elements stored in storage bins of storage carousels. The storage carousels are independently rotatable to rotate selected storage bins of the storage carousels into index positions. A transport mechanism is positionable proximate to the index positions and is operative to retrieve media elements from the storage bins of the storage carousels once rotated into the index positions.

18 Claims, 9 Drawing Sheets

APPARATUS AND ASSOCIATED METHOD FOR STORING, RETRIEVING, AND MANIPULATING COMPUTER, MASS-STORAGE MEDIA ELEMENTS

The present invention relates generally to computer-mass storage of information contained on media elements. More particularly, the present invention relates to a new and improved apparatus and method for storing, retrieving, and manipulating computer mass-storage media elements by employing independently-rotatable storage carousels with storage bins for storing media elements therein.

BACKGROUND OF THE INVENTION

In general, for most business computers to operate satisfactorily, it is necessary for the computer to store, retrieve, and process data. The data utilized by the computer is stored in media elements. When the data stored in the media elements is to be processed, the data is retrieved from the media elements, and thereafter to be processed by processing circuitry of the computer.

On-line storage of the data in on-line media elements permits the processing circuitry of the computer to access the data in a nearly-instantaneous manner. However, on-line media element storage is relatively expensive.

Off-line storage of the data in off-line media elements requires greater amounts of time for the computer to access the data stored therein, but off-line media element storage is relatively inexpensive.

Because of the relatively low cost of off-Line media element storage, data generally not required to be accessed in a nearly-instantaneous manner is usually stored in off-line media element storage. Data which is duplicative of data stored in on-line media elements is another example of data which is usually stored in off-line media elements.

Data is sometimes referred to as being "archived" when the data is stored in the off-line media elements. Archiving of data in the off-line media elements provides a relatively inexpensive means by which the data may be stored for extended time periods. Examples of off-line media elements which are oftentimes utilized to archive data include magnetic tapes (such as magnetic tapes housed within cartridges and referred to as media cartridges), magnetic discs, head disc assemblies, and optical discs. Media elements typically utilized to archive media are also, at times, referred to as archival-type media elements.

In many instances, large amounts of data are archived, thereby necessitating large numbers of off-line media elements to be utilized to store the data. The media elements are typically catalogued and stored in indexed, storage locations to facilitate subsequent retrieval of selected ones of the media elements.

Automated storage and retrieval apparatus is available to facilitate retrieval of the off-line media elements and permit a computer to access the data stored thereon. Such equipment typically includes fixed-location storage bins in which the media elements are stored. The storage bins are shelf-like assemblies in which the shelves of the storage bins define bin locations and the media elements are stored in the bin locations of the storage bins. A plurality of fixed-location storage bins are positioned in many different arrangements.

The automated storage and retrieval apparatus also includes a media element handler, or transport, mechanism. The media element handler mechanism is a remotely-controlled device which is capable of articulate movement to retrieve media elements stored in bin locations of the fixed-location storage bins.

When data stored on a selected media element positioned in a particular bin location of a storage bin is to be retrieved, appropriate commands are given to the media element handler mechanism to retrieve the selected media element. The media element handler mechanism includes actuator positioners which locate the handler mechanism in, for example, the X and Y directions and to orient the handler mechanism relative to the storage bins; and the bin locations thereof.

When the handler mechanism locates the bin location of the storage bin in which the selected media element is positioned, grasping arms of the handler mechanism grasp the selected media element, remove the media element from the bin location of the storage bin, and provide the selected media element to a media drive, such as a magnetic tape reader, an optical disc drive, a magnetic disc drive, or a receptacle for a head disc assembly. The media drive allows the data stored in the media element to be accessed by the processing circuitry of the computer. Data may also be stored on the media element by the computer by way of the media drive.

When the computer is required to access data stored on more than one media element, the media elements on which the data is stored are retrieved in a serial manner. That is to say, the media element handler mechanism of existing media retrieval equipment first retrieves a first media element and provides the first media element to the media drive whereat the data stored on the first media element is accessed by the computer. Thereafter, the handler mechanism returns the first media element to the bin location of the storage bin. The media handler then retrieves a second media element, and the same sequence is repeated with the second media element. Additional media elements are retrieved in similar fashion.

As the steps required to retrieve each media element must be performed serially, retrieval of each additional media element requires a cumulative increase in the amount of time required of the existing equipment to complete retrieval operations. When large numbers of media elements must be retrieved by the retrieval equipment, the amount of time required to retrieve all of such media elements to permit access by the computer to the data stored thereon can become significant.

Also, a large number of media elements are typically stored in bin locations of a large number of storage bins. Because the media element handler mechanism must retrieve a media element located in a bin location of any of the fixed-location storage bins, the handler mechanism must be capable of movement to any of the storage bins to retrieve media elements stored therein. Therefore, the handler mechanism must be capable of relatively complex movements, and, accordingly, is typically a relatively costly device.

It is with respect to these considerations and other background information relative to automated storage and retrieval equipment that the significant improvements of the present invention have evolved.

SUMMARY OF THE INVENTION

The present invention advantageously provides an apparatus, and an associated method, for storing, retrieving, and manipulating computer, mass-storage media elements. At least two storage carousels each include a plurality of storage bins for storing media elements. The storage carousels are independently rotatable to position selected storage bins at index positions. A transport mechanism is positionable proximate to the index positions for transporting media elements either out of or into storage bins of the storage carousels once the storage carousels have been rotated to position the selected storage bins at the index positions. Because the carousels are independently rotatable, while the transport mechanism is positioned proximate to the index position of a first of the storage carousels, a second of the storage carousels may be rotated to position a storage bin of the second carousel into the index position of the second storage carousel. As the actions occur concurrently, amounts of time required to retrieve media elements stored in various storage bins of the storage carousels are reduced. Also, because the storage bins are rotated into index positions, the complexity of the motions required of the transport mechanism to retrieve the media elements is reduced. And, as storage carousels may be tandemly-positioned, the number of media elements which may be stored upon a given floor-space area is increased.

In accordance with these and other aspects, a new apparatus, and an associated method, for storing media elements includes a first storage carousel which has a first plurality of storage bins for storing media elements in selected ones of the first plurality of storage bins. The first storage carousel is rotatable about a first carousel axis, thereby to permit rotation of a selected storage bin of the first plurality of storage bins into a first storage-carousel index position. A second storage carousel has a second plurality of storage bins for storing media elements in selected ones of the second plurality of storage bins. The second storage carousel is rotatable about a second carousel axis independent of rotation of the first storage carousel, thereby to permit rotation of a selected storage bin of the second plurality of storage bins into a second storage-carousel index position. At least one drive element is selectively engageable with the first storage carousel and the second storage carousel for generating a driving force to cause rotation of the first and second storage carousels. And, at least one transport mechanism is positionable proximate to the first storage-carousel index position for transporting media elements into and out of the first storage bin rotated into the first storage-carousel index position, and is positionable proximate to the second storage-carousel index position for transporting media elements into and out of the second storage bin rotated into the second storage-carousel index position.

A more complete appreciation of the present invention and its scope can be obtained from the accompanying drawings, which are briefly summarized below, the following detailed description of presently preferred embodiments of the invention, and the appended claims.

DESCRIPTION OF THE PREFERRED EMBODIMENTS

Figure 1:
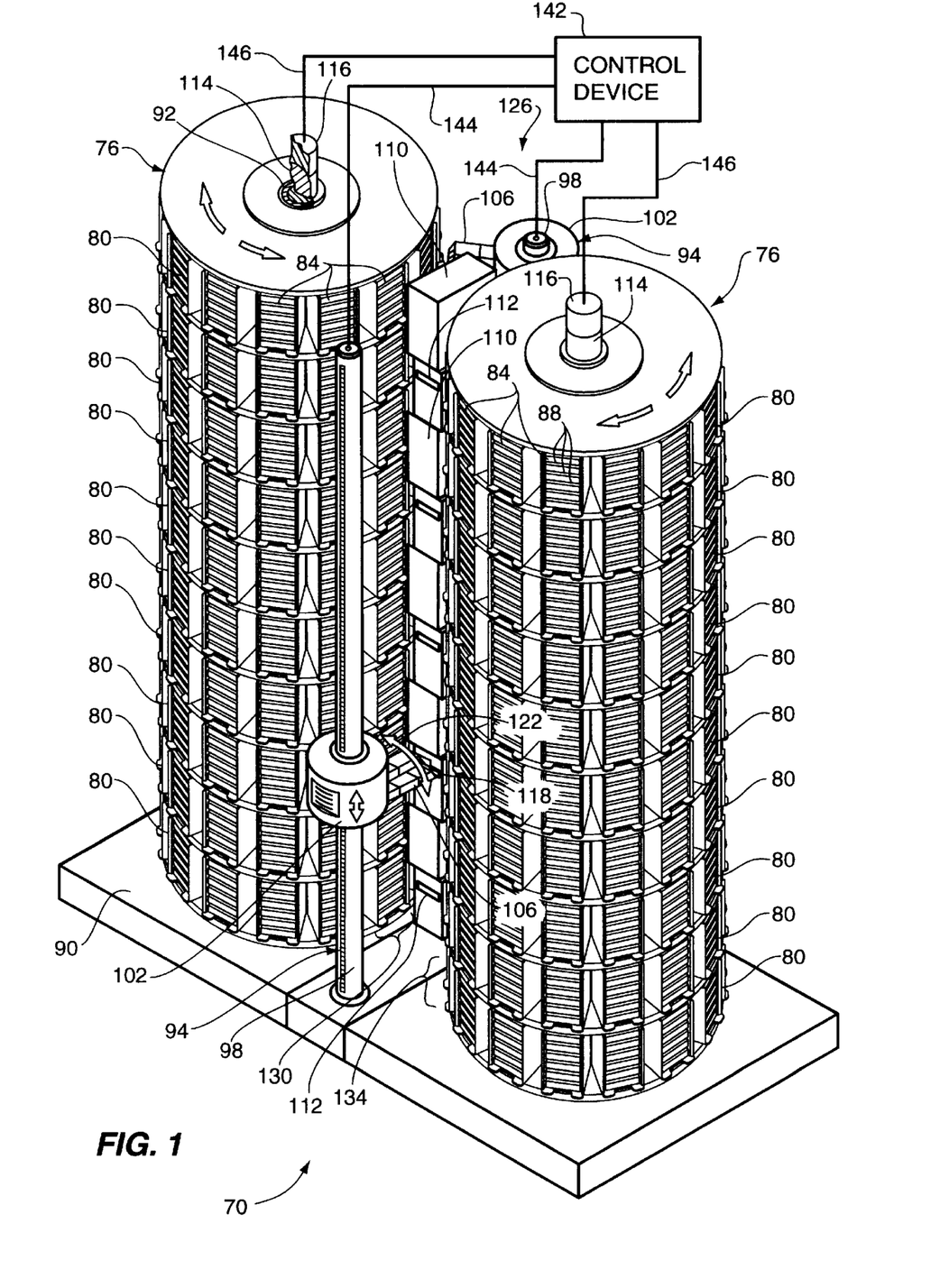
FIG. 1 is a generalized perspective view of a computer mass-storage, media element storage, retrieval, and manipulative apparatus representing a preferred embodiment of the present invention.

Referring first to FIG. 1, a computer mass-storage, media element storage, retrieval, and manipulative apparatus, referred to generally by reference numeral 70, is shown. The media element storage, retrieval and manipulative apparatus 70 comprises two carousel assemblies 76. Each carousel assembly 76 includes a plurality of tandemly-positioned, storage carousels 80. Each of the storage carousels 80 of the carousel assemblies 76 comprises a plurality of storage bins 84 which have shelf-like bin locations 88 for storing media elements therein. The carousel assemblies 76 are supported upon a supportive base 90.

Each of the storage carousels 80 of the carousel assemblies 76 is permitted rotation about a central shaft, such as shaft 92 which extends through the storage carousels 80 of the left-hand carousel assembly 76. While hidden from view in FIG. 1, the right-hand carousel assembly 76 also includes a shaft similar to shaft 92. The storage carousels 80 of each of the carousel assemblies 76 are permitted rotation independent of rotation of any of the others of the storage carousels 80.

Two transport mechanisms, each referred to generally by reference numeral 94, form portions of the apparatus 70. The transport mechanisms 94 are operative to retrieve media elements stored in the bin locations 88 of storage bins 84 of the storage carousels 80. The transport mechanisms 94 each include a transport shaft 98. The transport shafts 98 are supported upon the base 90. A support tube 102 is positioned about each transport shaft 98 to be permitted translation therealong. Each support tube 102 supports grasping arms 106 which are operative to grasp media elements which are stored in, or which are to be stored in, the bin locations 88 of the storage bins 84 of the storage carousels 80. The support tube 102 positioned about the transport shaft 98 is caused to be translated by conventional mechanisms, when desired, along the transport shaft 98 to position the support tube 102 and the grasping arms 106 at an elevation corresponding to the elevation of any of the storage carousels 80 of either of the carousel assemblies 76.

A plurality of media drives 110 are positioned in tandem and are supported upon the base 90 proximate to the transport mechanisms 94 and also proximate to the carousel assemblies 76. As illustrated in FIG. 1, the media drives 110 are positioned between the two carousel assemblies 76. The media drives 110 are arranged such that receiving slots 112 of alternating ones of the media drives 110 face the forward transport mechanism 94 and the receiving slots of the other media drives 110 face the rear transport mechanism 94. The media drives 110 are operable to read information contained on, or write information to, media elements when the media elements are received within the media drives. The media drives 110 are connected to circuitry of a computer (not shown) to provide data read from the media elements by the media drives to the computer or to provide data from the computer to be written to the media elements in the media drives 110.

As shown in FIG. 1, rotational drive motors 114 are positioned above each of the carousel assemblies 76. The rotational drive motors 114 are operative to generate a driving force to cause rotation of individual ones of the storage carousels 80. The shafts 92 extending through central portions of each of the storage carousels 80 rotate during operation of the drive motors 114. The drive shafts 92 engage selected ones of the storage carousels 80 to cause rotation of the selected storage carousel. Linear drive motors 116 are further shown in FIG. 1. Linear drive motors 116 comprise linear motors operative to generate axial forces to cause translation of positioning rods (not shown in FIG. 1). The positioning rods which are caused to be translated by axial forces generated by linear drive motors 116 shall be discussed in detail with respect to FIGS. 3–5 hereinbelow.

The support tubes 102 of the transport mechanisms 94 are permitted limited rotational movement about the respective transport shafts 98, achieved by conventional mechanisms. The support tubes 102 of the transport mechanisms 94 are rotatable about the transport shafts 98 to position the grasping arms 106 alternately proximate to the media drives 110 or proximate to the storage carousels 80 of both of the carousel assemblies 76. Because the storage carousels 80 of the carousel assemblies 76 are rotatable, a bin location 88 of any of the storage bins 84 of any of the storage carousels 80 may be rotated into position to permit access thereto by grasping arms 106 of one of the transport mechanisms 94.

Grasping arms 106 of the forward (as shown) transport mechanism 94 are positioned at a media drive 110. By rotating the support tube 102 in a direction indicated by arrow 118, the grasping arms 106 are positioned proximate to a selected storage bin 84 of a selected storage carousel 80 of the right-hand carousel assembly 76. By rotating support tube 102 in a direction indicated by arrow 122, the grasping arms 106 are positioned proximate to a selected storage bin 84 of a selected storage carousel 80 of the left-hand carousel assembly 76.

The grasping arms 106 of the rear (as shown) transport mechanism 94 are positioned proximate to a selected storage bin of a selected storage carousel 80 of the left-hand carousel assembly 76. By rotation of the support tube 102 of the rear transport mechanism 94 in a direction indicated by arrow 126, the grasping arms 106 thereof may be positioned proximate to a selected media drive 110 or a selected storage bin 84 of a selected storage carousel 80 of the right-hand carousel assembly 76. The term "index position" shall be used herein to indicate a position into which a storage bin may be rotated to permit access thereto by a transport mechanism 94. Index positions associated with the bottom-most storage carousels 80 of the two carousel assemblies 76 are shown by brackets 130 and 134 in FIG. 1. Any selected storage bin of the bottom-most storage carousel 80 of the left-hand carousel assembly 76 may be rotated into the index position 130, and any selected storage bin of the bottom-most storage carousel 80 of the right-hand carousel assembly 76 may be rotated into index position 134. Index positions associated with others of the storage carousels 80 are located above those shown at index positions 130 and 134. Analogous index positions (not shown) exist with respect to the rear transport mechanism 94.

Because any selected storage bin 84 of any of the storage carousels 80 may be rotated into an index position and because the transport mechanism is vertically moveable along the transport shaft 98, the transport mechanism 94 is able to access any selected storage bin 84 and the media elements stored in bin locations thereof, once the selected storage bin has been rotated into an index position, by translation of support tube 102 of the transport mechanism 94 along transport shaft 98 thereof and appropriate rotation of the support tube 102 about the transport shaft 98.

The support tubes 102 of the transport mechanisms 94 are required to be translatable along a respective transport shaft 98 and to be rotatable into a limited number of rotational positions. That is to say, the conventional driving mechanisms (not shown) which cause translation and rotation of the support tubes 102 are required merely to cause translation of the support tubes 102 along the respective transport shafts 98 to position the support tubes at the elevations corresponding to the elevations of the storage carousels 80, and thereafter to cause rotation of the support tubes 102 into any of three positions—proximate to left-hand storage carousel 76, proximate to right-hand storage carousel 76, or proximate to media drive 110. Further, because the storage carousels 80 of the carousel assemblies 76 are capable of independent rotation, storage and retrieval operations for storing and retrieving media elements stored in and retrieved from the bin locations 88 need not be performed in an entirely serial manner. Rather, when a transport mechanism 94 is positioned proximate to a media drive 110 or a storage bin 84 of a first of the storage carousels 80, others of the storage carousels 80 may be rotated into index positions to permit access thereto by one of the transport mechanisms 94. And, because the storage carousels 80 of the carousel assemblies 76 are tandemly positioned, a large number of media elements may be stored in the carousel assemblies 76 upon any given floor-space area. A conventional control device 142 controls the translational and rotational movement of each transport mechanism 94 and the rotation of each carousel assembly 76. A control line 144 extends between transport mechanism 94 to connect transport mechanism 94 and the control device 142. Similarly, a control line 146 extends between the rotational drive motors 114 and linear drive motors 116 and control device 146. The control device 142 is operative to control rotation of the storage carousels 80 of the carousel assemblies (by controlling rotation of rotational drive motors 114) and also to control the positioning of the support tubes 102 and grasping arms 106 of transport mechanisms 94.

Figure 2:
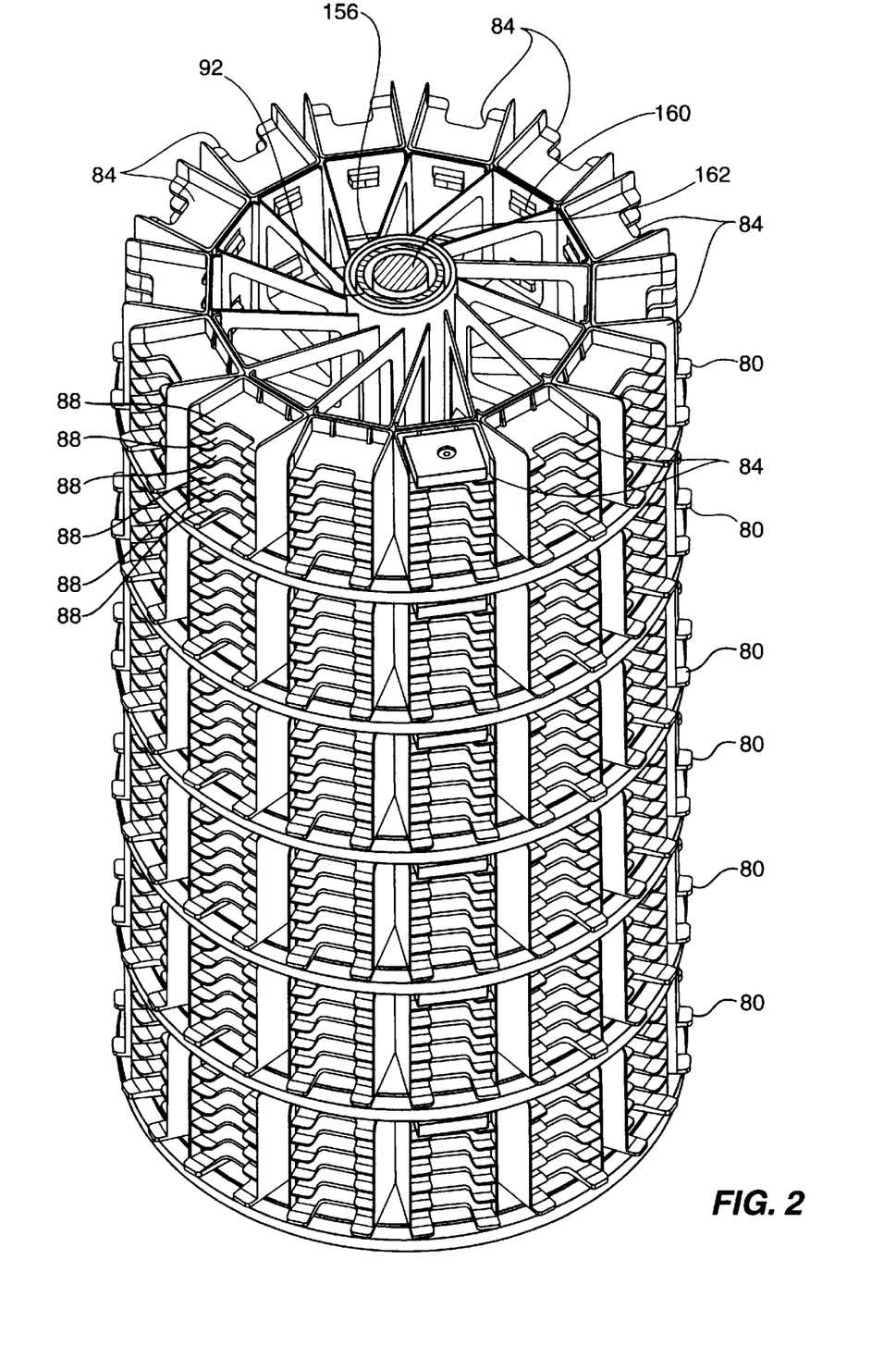
FIG. 2 is a perspective view of a plurality of tandemly-positioned carousels which form a portion of the storage, retrieval, and manipulative apparatus shown in FIG. 1.

Turning next to FIG. 2, several carousels 80 which form a portion of the left-hand carousel assembly 76 shown in FIG. 1 are illustrated in greater detail. Each of the storage carousels 80 includes a plurality of storage bins 84, and each of the storage bins 84 has a plurality of bin locations 88 which permit the storage of media elements therein. The storage bins 84 of each of the storage carousels 80 are connected to a central hub section 156 by spoke members 160. The shaft 92 extends through the central hub sections 156 of the storage carousels 80. The shaft 92 is tubular, and a non-rotatable positioning rod 162 extends through shaft 92.

Figure 3:
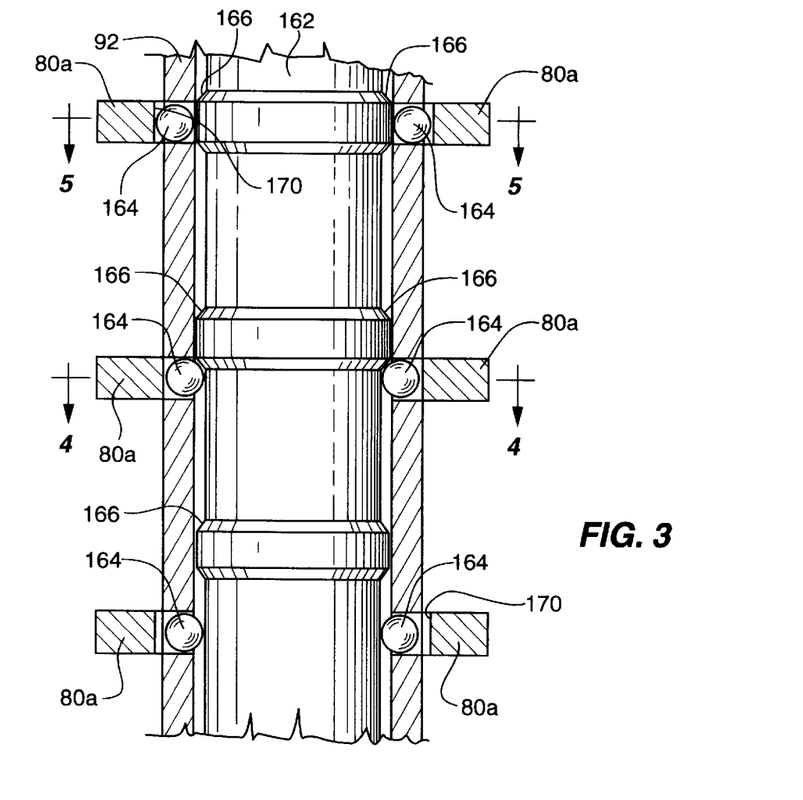
FIG. 3 is an axial sectional view of a portion of a drive shaft which forms a portion of the carousels taken through the line 3—3 of FIG. 2.

In order to rotate selected ones of the carousels, the drive shaft 92 engages with a elected one of the storage carousels 80 to impart the rotational motion of the shaft 92 to the selected one of the storage carousels 80, as can be understood from FIG. 3. A series of clutch bearings 164 are positioned about circumferential locations of shaft 92 at spaced apart distances along shaft 92. The spaced-apart locations at which clutch bearings 164 are positioned along shaft 92 correspond to the positions at which carousels 80 are located. Portions 80a of three tandemly-positioned carousels 80 are illustrated in FIG. 3. A positioning rod 162 extending through shaft 92 includes a series of spaced-apart cam surfaces 166 which can be selectively positioned to abut against clutch bearings 164, depending upon the axial position of positioning rod 162 within the drive shaft 92. The positions at which the cam surfaces 166 are located are carefully selected such that the cam surfaces 166 of the positioning rod 162 abut against the clutch bearings 164 associated with only a single storage carousel portion 80a when the positioning rod 162 is positioned at a selected axial position. By translating the positioning rod 162 by operation of linear drive motor 116 to alter the axial position thereof, selected cam surfaces 166 of the positioning rod 162 are positioned to abut against clutch bearings 164 associated with any particular storage carousel portion 80a.

As shown in FIG. 3, the cam surface 166 of the positioning rod 162 is positioned to abut against the clutch bearings 164 located at the top-most carousel 80. When the cam surfaces of the positioning rod 162 abut against clutch bearings 164, the carousel 80 positioned proximate thereto is caused to be rotated in unison with rotation of the shaft 92. Other cam surfaces 166 of positioning rod 162 do not abut against bearings 164 to cause carousels 80 associated with such other bearings 164 to rotate in unison with rotation of the shaft 92. By appropriate translation of positioning rod 162 by conventional means of the motor 116, any one of the storage carousels 80 may be caused to rotate together with rotation of shaft 92.

Figure 4:
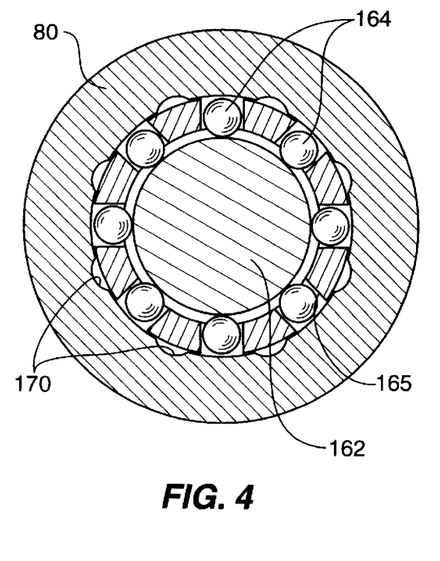
FIG. 4 is a sectional view taken through line 4—4 of FIG. 3.
Figure 5:
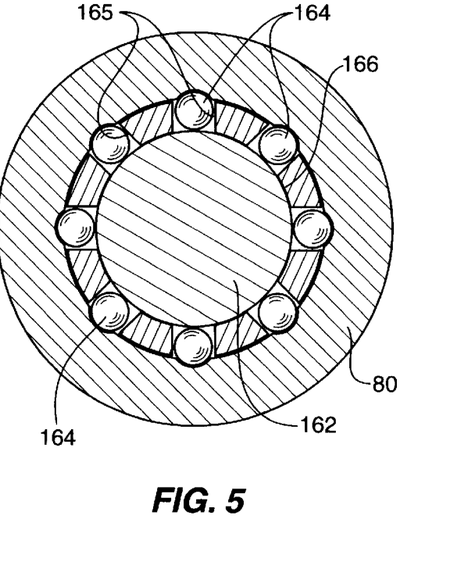
FIG. 5 is a sectional view taken through line 5—5 of FIG. 3.

FIGS. 4 and 5 illustrate how the clutch bearings 164 selectively engage and disengage the carousels 80 to the drive shaft 92. Semi-circular, slotted grooves 170 are shown in FIGS. 4 and 5 and are formed in the portions 80a of each of the storage carousels 80. The cam surfaces 166 of the positioning rod 162 do not engage with the bearings 164 as shown in the sectional view of FIG. 4, and bearings 164 are not caused to engage with carousel 80 to cause the carousel 80 associated with such bearings 164 to rotate together with rotation, of shaft 92. As shown in FIG. 5, when the cam surfaces 166 of positioning rod 162 abut against bearings 164, the bearings 164 are forced to extend into grooves 170 of carousel 80 to cause the carousel thereafter to rotate together with rotation of shaft 92. The cam surfaces 166 of positioning rod 162 abut against the bearings 164 to force bearings 164 into the grooves 170 of carousel 80, so as the shaft 92 rotates with the bearings 164 engaging with carousel 80 and carried in slots 165 by the shaft, rotation of shaft 92 causes rotation of carousel 80 therewith. Once a selected storage carousel 80 has been rotated in unison with the shaft 92 to position a storage bin 84 of the selected storage carousel 80 at an index position, such as index position 130 or index position 134, the selected storage carousel 80 is disengaged from shaft 92. Once the selected storage carousel 80 is disengaged from shaft 92, rotational forces are no longer applied to the carousel, and the storage bin 84 thereof remains positioned at the index position. Disengagement of the storage carousel 80 from the drive shaft 92 is effectuated by translation of positioning rod 162 such that cam surfaces 166 of the positioning rod do not abut against the clutch bearings 164 associated with the storage carousel 80.

Figure 6:
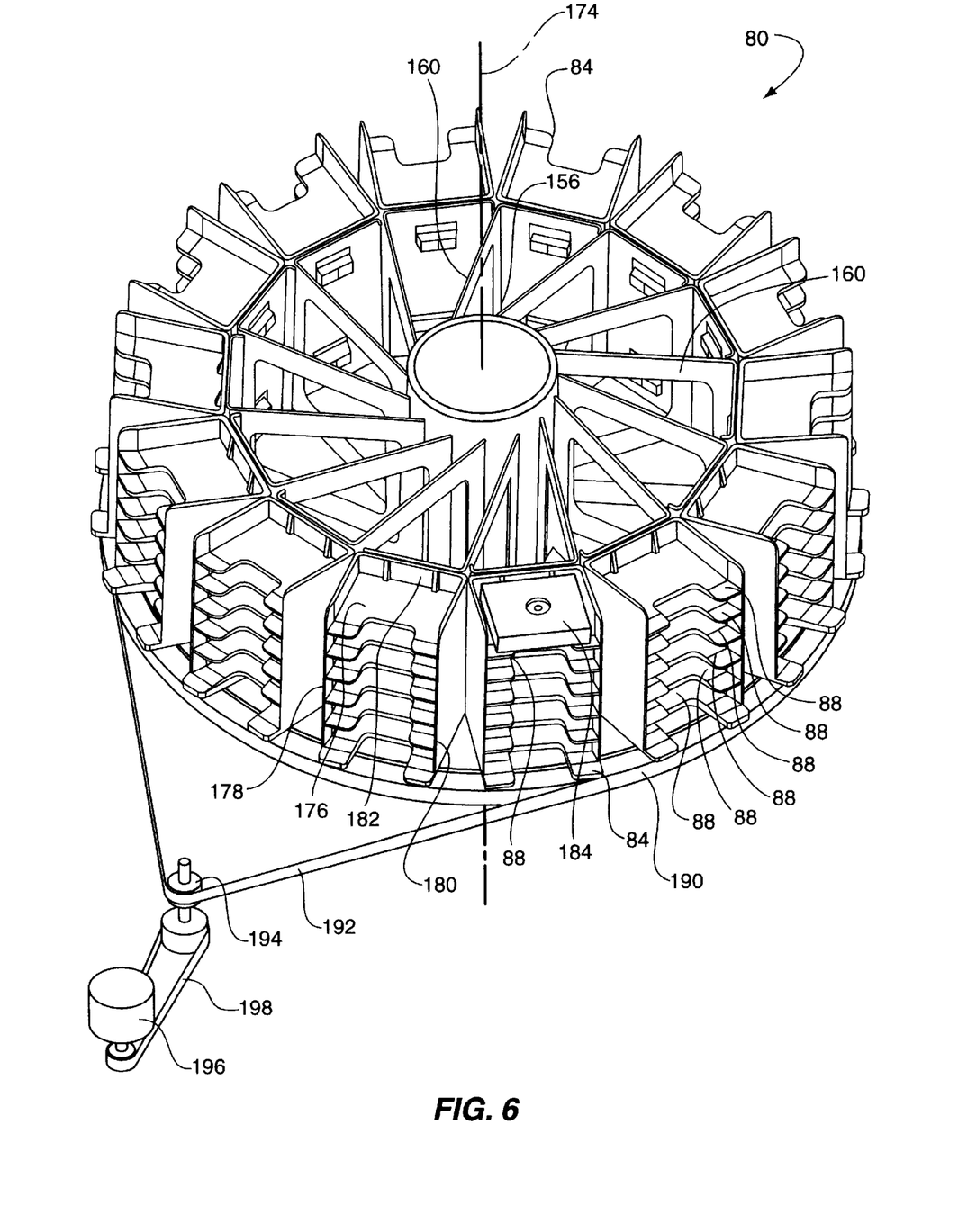
FIG. 6 is a perspective view of a single carousel of the plurality of tandemly-positioned carousels shown in FIGS. 1 and 2, which additionally shows an alternative drive element for a carousel.

Details of a carousel 80 are shown in FIG. 6. The carousel 80 shown in FIG. 6 is driven by an alternative drive element rather than the rotational drive motors 114 which cause rotation of the carousels 80 shown in FIG. 1. Storage bins 84 of the storage carousel 80 are positioned in a circular arrangement about a central axis 174 of the carousel 80. Each of the storage bins 84 comprise a series of vertically-stacked shelves formed of shelf surfaces 176 which define bin locations for storing media elements therein.

The bin locations 88 of the storage bins 84 are bounded by opposing, radial side walls 178 and 180, a back wall 182, and the shelf surfaces 176 of the storage bins 84. The shelf surfaces 176 of the storage bins 84 are sloped downward in a radially inward direction to assist in maintaining media elements in position in the respective ones of the bin locations 88. For example, the shelf surfaces 176 of storage bins 84 may be angled downward 10° extending towards back walls 182 of the storage bins 84.

The shelf surfaces 176 of the storage bins 84 are of dimensions, and the opposing, radial sidewalls 178 and 180 of the storage bins 84 are spaced apart by distances, to permit conventional storage element media cartridges to be stored in the bin locations 88 of the storage bins 84. For purposes of illustration, a single media cartridge 184 is illustrated in one of the bin locations 88 of a storage bin 84. Other media cartridges 184 may be similarly stored in other bin locations 88 of any of the storage bins 84. Storage bins 84 may be constructed to receive a variety of other types of media elements.

Each of the storage bins 84 is affixed to the central hub section 156 by the spoke members 160. The central hub section 156 is tubular in configuration, defining a central aperture 188 centered about the central axis 174. The diameter of the central hub section 156 is of dimensions to permit the drive shaft 92 to extend therethrough. The central hub section 156 comprises portions 80a and grooves 170 shown in FIGS. 3–5.

The spoke members 160 extend at angles perpendicular to back walls 182 of individual ones of the storage bins 84. The spoke members 160 extend at the perpendicular angles relative to the back walls 182 of the storage bins 84 to facilitate ease of assembly of carousel 80. Other manners of affixing the storage bins 84 to central hub section 156 by way of spoke members 160, may, of course, be utilized.

A pulley 190 is positioned beneath each storage bin 84 and is coupled to rotate together with the storage bins 84. A belt 192 extends around the pulley 190 and an idler shaft 194. The idler shaft 194, in turn, is coupled to a rotational drive motor 196 by another belt 198. Rotation of the rotational drive motor 196 causes the belt 198 to rotate the shaft 194 which, in turn, rotates the belt 192 and pulley 190 to impart a driving force to cause rotation of carousel 80.

Figure 7:
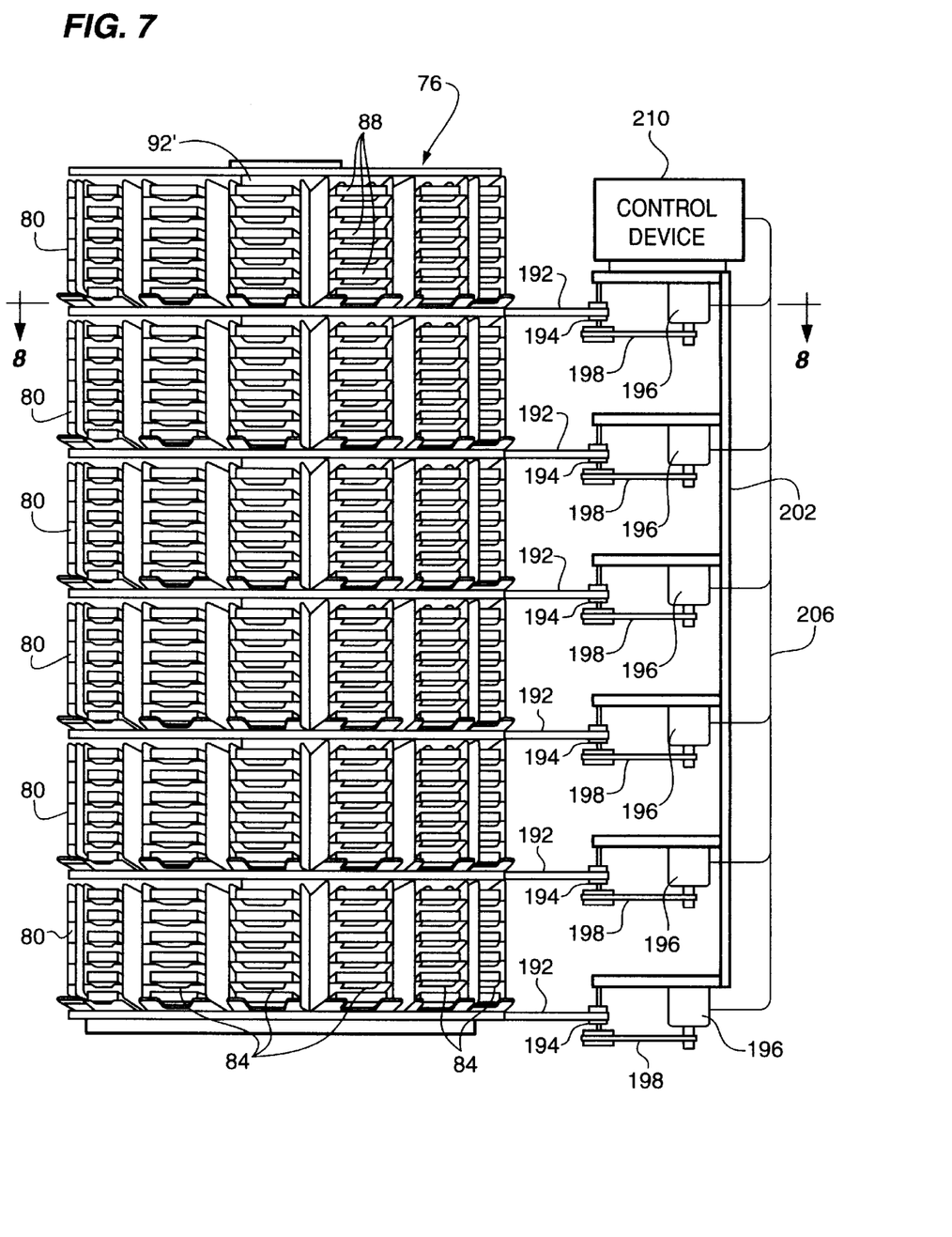
FIG. 7 is a side elevational view of a computer mass-storage, media element storage, retrieval, and manipulative apparatus representing an alternate preferred embodiment of the present invention formed by a plurality of storage carousels and drive elements such as those shown in FIG. 6.
Figure 8:
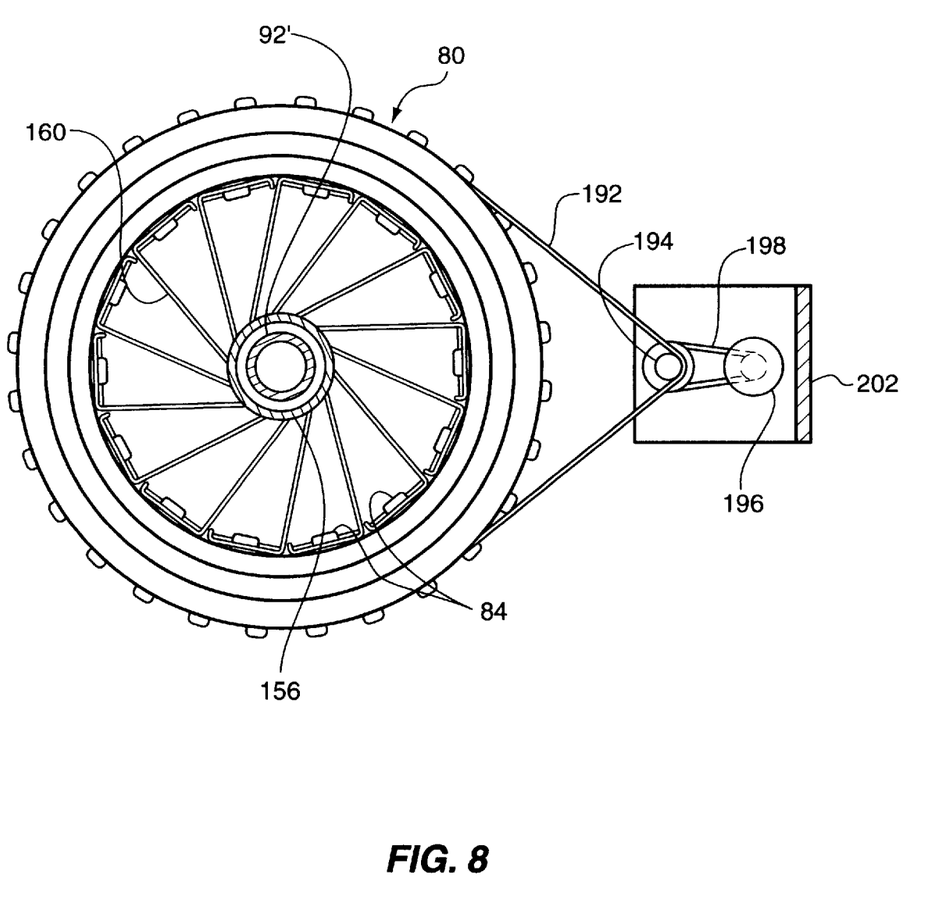
FIG. 8 is a sectional view of the computer mass-storage media element storage, retrieval, and manipulative device taken through line 8—8 of FIG. 7.

The use of the drive arrangement shown in FIG. 6 is employed in the carousel assembly 76 as shown in FIGS. 7 and 8. Each of the tandemly-positioned carousels 80 of the carousel assembly 76 is permitted rotation independent of rotation of any of the other carousels 80 by a separate motor 196. The shaft 92' extending through the carousels 80 comprises a support shaft about which rotation of the carousels 80 is permitted. The pulleys 190 of each storage carousel 80 are coupled, by way of belts 192, to individual shafts 194 which are, in turn, coupled to rotational drive motors 196 by belts 198, as previously shown in FIG. 6. A multi-level support platform 202 supports each of the rotational drive motors 196. Control lines 206 connect each of the rotational drive motors 196 with a conventional control device 210. The control device 210 is operative to control operation of the rotational drive motors 196 and, in turn, rotation of individual ones of the storage carousels 80.

It should be understood that alternate methods of applying the driving forces to cause rotation of selected storage carousels are also possible. For instance, with respect to the embodiment of FIGS. 7–8, the idler arms 194 may be removed, and the rotational drive motors 196 may be coupled by way of belts to pulleys 190. In yet another embodiment, the plurality of motors 196 may be substituted with a drive motor-rotating shaft-positioning rod arrangement analogous to that shown in FIGS. 1–5 in which rotational drive motors 114 and linear drive motors 116 generate forces to cause rotation and translation of shaft 92 and rod 162. By positioning the rotational drive motors, rotating shaft, and positioning rod beyond the storage carousels and interconnecting the drive shaft with the carousels 80 by way of belts, driving forces may similarly be applied to the carousels 80 to cause rotation thereof.

Figure 9:
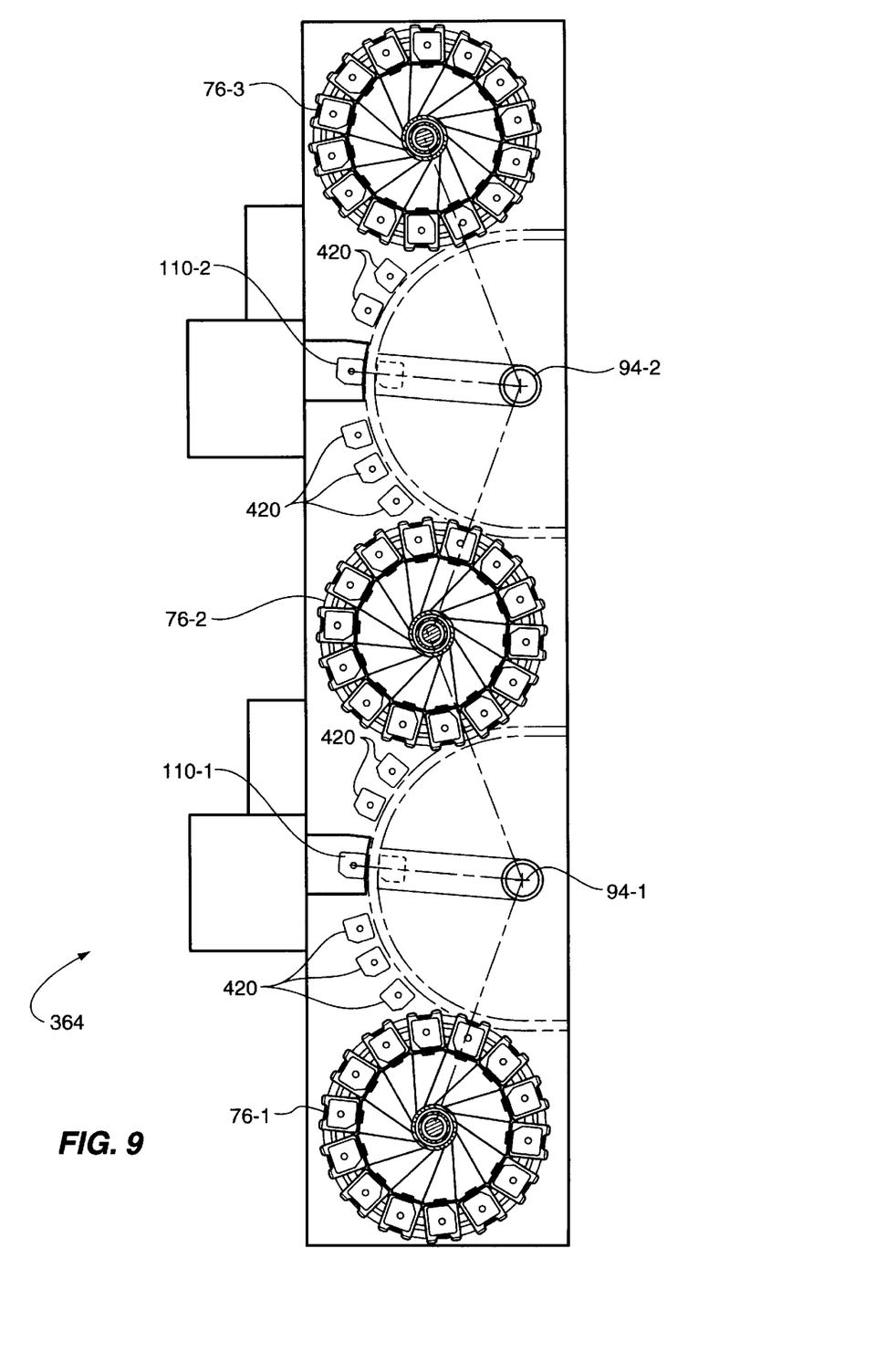
FIG. 9 is a plan view, in generalized, functional form, illustrating a storage system which utilizes the storage, retrieval, and manipulative apparatus shown in FIG. 1 as a portion thereof.

The use of the components of the present invention in a different form than that shown in FIG. 1, is shown in FIGS. 9 and 10. A storage system, referred to generally by reference numeral 364, utilizes carousel assemblies 76-1, 76-2, and 76-3, transport mechanisms 94-1 and 94-2, and media drives 110-1 and 110-2 as shown in FIG. 9. Carousel assemblies 76-1 and 76-2 and media drives 110 are operable in conjunction with transport mechanism 94-1 in a manner analogous to operation of apparatus 70 shown in FIG. 1. Carousel assemblies 76-2 and 76-1 and media drives 110 are similarly also operable in conjunction with transport mechanism 94-2 in a manner analogous to operation of media storage and retrieval apparatus 70 shown in FIG. 1.

Fixed-location storage bins 420, positioned in a semicircular arrangement about transport mechanisms 94-1 and 94-2, are also employed. Transport mechanisms 94-1 and 94-2 are further operable to be positioned proximate to the fixed-location storage bins 42 to retrieve media elements stored therein.

In the storage system 364, a media element stored in a bin location of a storage bin of carousel assembly 76-1 may be transferred to a bin location of a storage bin of carousel assembly 76-2 by the transport mechanism 94-1. And, a media element stored in a bin location of a storage bin of carousel assembly 76-2 may be transferred to a bin location of a storage bin of carousel assembly 76-3 by the transport mechanism 94-2. In such manner, a media element may be transferred between a bin location of a storage bin of carousel assembly 76-1 and a bin location of a storage bin of carousel assembly 76-3. As the storage capacity requirements of storage system 364 increase, additional numbers of carousel assemblies may be added.

Figure 10:
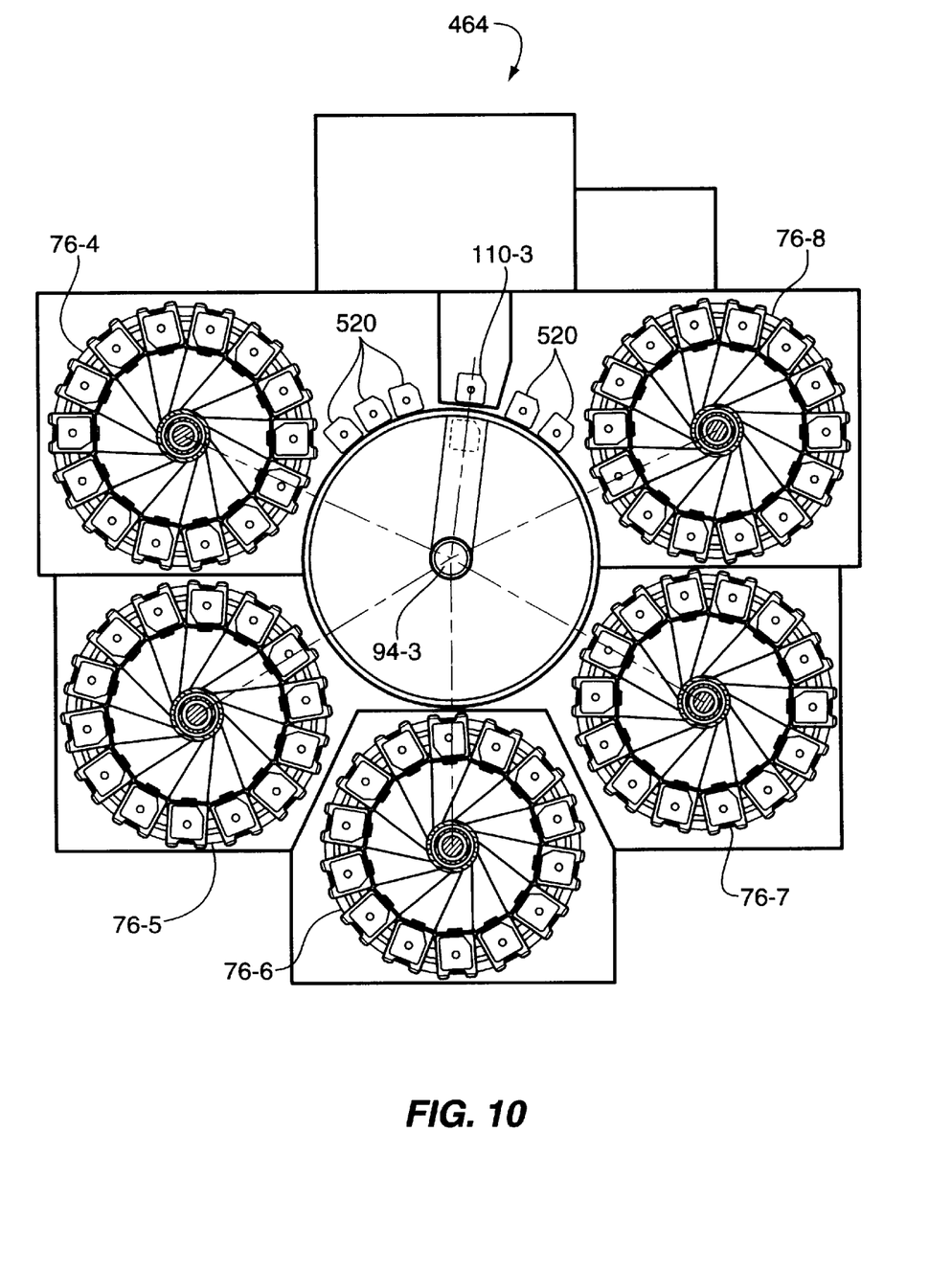
FIG. 10 is another plan view, similar to that of FIG. 9, but illustrating a storage system of another arrangement which also utilizes the storage, retrieval, and manipulative apparatus shown in FIG. 1 as a portion thereof.

Another storage system, referred to generally by reference numeral 464 in FIG. 10, illustrates an arrangement which also utilizes additional carousel assemblies with a single transport mechanism 94-3. The transport mechanism 94-3 is positionable at an index position of any of the carousel assemblies 76-4 through 76-8, at media drive 110-3, or at any of the fixed-location storage bins 520. Media elements stored in bin locations of any of the carousel assemblies 76-4 through 76-8 or the bin locations of fixed-location storage bins 520 are accessible by transport mechanism 94-3. Because large numbers of media elements may be stored in bin locations of the storage bins of the five carousel assemblies 76-4 through 76-8, the storage capacity of storage system 464 is significantly increased. And, because the carousels of each of the carousel assemblies 76-4 through 76-8 are independently rotatable, a media element stored in any of the bin locations of the storage bins of the carousel assemblies may be accessed relatively quickly.

Figure 11:
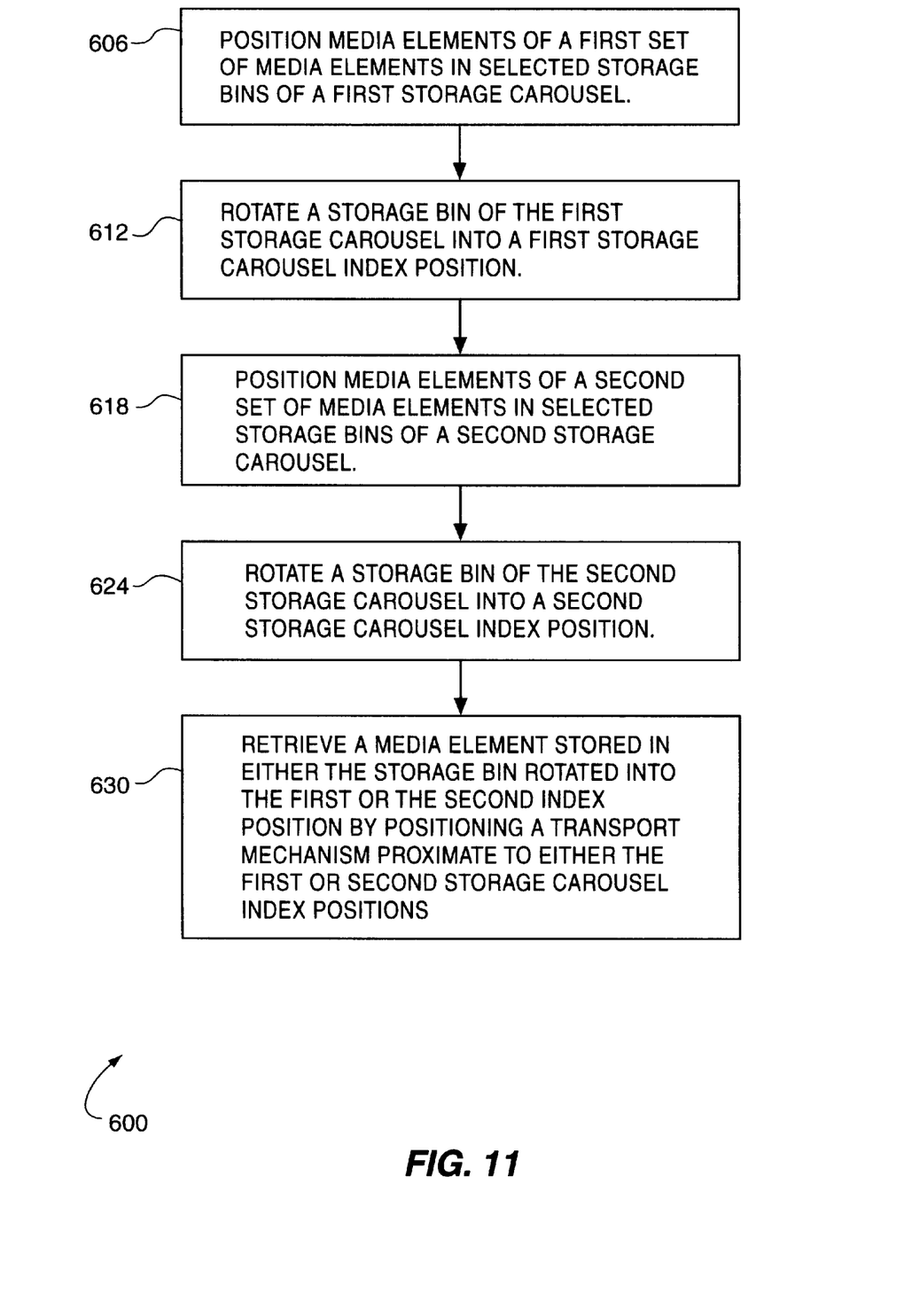
FIG. 11 is a logical flow diagram listing the steps of a method of a preferred embodiment of the present invention.

A logical flow diagram of the method steps of a method, referred to generally by reference numeral 600 in FIG. 11, of a preferred method for storing and retrieving data are listed.

First, and as indicated by block 606, media elements of a first set of media elements are positioned in selected storage bins of a first storage carousel which is rotatable about a first carousel axis.

Next, and as indicated by block 612, a desired storage bin of the first storage carousel is rotated into a first storage-carousel index position by rotating the first storage carousel about the first carousel axis.

Next, and as indicated by block 618, media elements of a second set of media elements are positioned in selected storage bins of a second storage carousel which is rotatable about a second carousel axis independent to rotation of the first storage carousel.

Then, and as indicated by block 624, a desired storage bin of the second storage carousel is rotated into a second storage-carousel index position by rotating the second storage carousel about the second carousel axis. Rotation of the second carousel occurs independently of the rotation of the first carousel.

Lastly, and as indicated by block 630, a media element stored in either the storage bin of the first storage carousel rotated into the first storage-carousel index position or the storage bin of the second storage carousel independently rotated into the second storage-carousel index position is retrieved by positioning the transport mechanism proximate to either the first storage-carousel index position or the second storage-carousel index position.

The time required to rotate a single carousel 80 to position a desired storage bin thereof into an index position is less than the time which would be required to rotate the whole carousel assembly. Increased settling times would also be required for stopping the carousel assembly 76 upon termination of application of the rotating force. If the individual carousels 80 were not separately rotatable, the combined weights of the carousels 80 of each of the assemblies 76 would require a drive element of greater capacity to generate sufficient drive force to rotate the complete carousel assembly.

The independent rotation permitted of the individual ones of the storage carousels 80 of the carousel assemblies 76 also permits various ones of the carousels 80 to be rotated independently and concurrently to position various ones of the storage bins of various ones of the carousels 80 at index positions. That is to say, when data stored upon selected media elements located in particular bin locations 88 of storage bins 84 of storage carousels 80 is to be retrieved by processing circuitry of a computer, the storage carousels 80 containing the storage bins 84 in which such media elements are stored are rotated into index positions to permit a transport mechanism 92 to retrieve the selected media elements. Because the storage carousels are independently rotatable, as a transport mechanism 92 is retrieving a first of the selected media elements, storage carousels 80 containing the storage bins 84 in which others of the selected media elements are stored may be rotated into index positions. Accordingly, amounts of time required for the transport mechanism to access the selected media elements are reduced. And, because the transport mechanism 92 used to retrieve the media elements must be capable of accessing only the storage bins 84 rotated into the index positions, the complexity of the motions required of the transport mechanism is reduced. Further, because the storage carousels may be tandemly-positioned, the number of media elements which may be stored in the storage bins of the storage carousels upon a given floor-space area is increased.

Presently preferred embodiments of the present invention and many of its improvements have been described with a degree of particularity. The previous descriptions are of preferred examples for implementing the invention, and the scope of the invention should not necessarily be limited by this description. The scope of the present invention is defined by the following claims.

I claim:

1. An apparatus for storing, retrieving, and manipulating media elements, said apparatus comprising:

a first storage-carousel having a first plurality of storage bins for storing media elements in selected ones of the first plurality of storage bins, said first storage-carousel rotatable about a first central shaft to permit rotation of a selected storage bin of the first plurality of storage bins into a first storage-carousel index position;

a second storage-carousel having a second plurality of storage bins for storing media elements in selected ones of the second plurality of storage bins, said second storage-carousel rotatable about the first central shaft, the second storage-carousel rotating independently of the first storage-carousel to permit rotation of a selected storage bin of the second plurality of storage bins into a second storage-carousel index position independently of rotation of the selected storage bin of the first plurality of storage bins into the first storage-carousel index position;

a common carousel drive element alternatively engageable with a selected one of the first storage-carousel or the second storage-carousel and operable to rotate only the engaged and selected one of the first or second storage-carousels independently of rotation of the other one of the first or second storage-carousels, the common drive element rotating only the engaged and selected one of the first or second storage-carousels to thereby position the selected storage bin of the first plurality of storage bins into the first storage-carousel index position, or to position alternatively the selected storage bin of the second plurality of storage bins into the second storage-carousel index position; and at least one transport mechanism positionable proximate to the first storage-carousel index position for transporting media elements alternately into and out of the storage bin rotated into the first storage-carousel index position and positionable proximate to the second storage-carousel index position for transporting media elements alternately into and out of the storage bin rotated into the second storage-carousel index position.

2. The apparatus of claim 1 wherein said first storage-carousel and said second storage-carousel are positioned in tandem.

3. The apparatus of claim 2 wherein said at least one transport mechanism comprises: a transport shaft of a heightwise dimension corresponding to at least a portion of collective heights of the first and second storage-carousels, and a support tube positioned about the transport shaft to be translatable therealong, said support tube having media-element grasping arms extending therefrom for grasping media elements therewith.

4. The apparatus of claim 3 wherein the support tube of the at least one transport mechanism is further rotatable about at least a portion of the transport shaft.

5. The apparatus of claim 1 further comprising a third storage-carousel having a third plurality of storage bins for storing media elements in selected ones of the third plurality of storage bins, said third storage-carousel rotatable about a second central shaft, said third storage-carousel rotating independently of the first storage-carousel and the second storage-carousel to permit rotation of a selected storage bin of the third plurality of storage bins into a third storage-carousel index position, and a second drive element engageable with said third storage-carousel to rotate the third storage carousel to position the selected storage bin of the third plurality of storage bins into the third storage-carousel index position.

6. The apparatus of claim 5 wherein said at least one transport mechanism comprises: a transport shaft and a support tube positioned about the transport shaft and rotatable about at least a portion thereof, said support tube having media-element grasping arms extending therefrom for grasping media elements therewith.

7. The apparatus of claim 1 wherein the first storage-carousel and the second storage-carousel, each contain a central hub section wherein the central hub sections of the first and second storage-carousels, respectively, are each formed of apertures extending through the first and second storage-carousels.

8. The apparatus of claim 7 wherein said common carousel drive element comprises a drive motor operable to generate a rotational driving force and means coupled to receive the driving force generated by said drive motor and alternatively engageable with the selected one of said first storage-carousel or said second storage-carousel for imparting the rotational driving forces generated by said drive motor to rotate the selected one of said first storage-carousel or said second storage-carousel.

9. The apparatus of claim 8 wherein said means for imparting the driving forces comprises a drive shaft engageable with the selected one of the first or second storage-carousels.

10. The apparatus of claim 9 further comprising an engaging mechanism for engaging the drive shaft with the selected one of the first storage-carousel or the second storage-carousel to cause the driving force generated by the common carousel drive element to be applied alternately to the selected one of the first storage-carousel and the second storage-carousel.

11. The apparatus of claim 1 further comprising at least one media-element reader for receiving media elements therein and for reading data contained on the media elements when received therein.

12. The apparatus of claim 11 wherein said at least one transport mechanism is further positionable proximate to the at least one media-element reader and is further operable to transport media elements between the storage bin of the first storage-carousel rotated into the first storage-carousel index position and the at least one media-element reader.

13. The apparatus of claim 12 wherein said at least one transport mechanism is further operable to transport media elements between the storage bin of the second storage-carousel rotated into the second storage-carousel index position and the at least one media-element reader.

14. The apparatus of claim 1 further comprising a control device for controlling rotation of the first and second storage-carousels, respectively, and for controlling positioning of the at least one transport mechanism.

15. A method for storing, retrieving, and manipulating computer mass-storage media elements, said method comprising the steps of:

positioning a first set of media elements in selected storage bins of a first storage carousel which is rotatable about a central shaft;

positioning a second set of media elements in selected storage bins of a second storage carousel which is rotatable about the central shaft independently of rotation of the first storage carousel;

engaging a common carousel drive element alternatively with a selected one of the first storage carousel or the second storage carousel and rotating only the selected one of the first or second storage carousels with the engaged common carousel drive element;

positioning a selected storage bin of the first storage carousel into a first storage-carousel index position by rotating the first storage carousel with the engaged common carousel drive element;

positioning a selected storage bin of the second storage carousel into a second storage carousel index position by rotating the second storage carousel with the engaged common carousel drive element;

retrieving a media element stored in the selected storage bin of the first storage carousel when rotated into the first storage-carousel index position; and     retrieving a media element stored in the selected storage bin of the second storage carousel when rotated in the second storage-carousel index position.

16. The method of claim 15 comprising the further step of transporting the media element retrieved during said step of retrieving to a media-element reader which receives media elements therein and which reads data contained on the media elements received therein.

17. A data storage and retrieval apparatus for storing, retrieving, and manipulating computer mass-storage media elements, said apparatus comprising:

a first storage carousel having a first plurality of storage bins for storing media elements therein, said first storage carousel rotatable about a first central shaft;

a second storage carousel having a second plurality of storage bins for storing media elements therein, said second storage carousel rotatable independent of rotation of the first storage carousel about a second central shaft that is physically spaced from the first central shaft;

a third storage carousel having a third plurality of storage bins for storing media elements therein, said third storage carousel rotatable about a third central shaft that is physically spaced from the first and second central shafts, said third storage carousel rotatable independently of rotation of the first storage carousel and of the second storage carousel;

a first transport mechanism positioned between said first storage carousel and said second storage carousel, said first transport mechanism for retrieving a media element stored in a selected storage bin of said first storage carousel, and for transferring the media element to a selected storage bin of said second storage carousel; and     a second transport mechanism positioned between said second storage carousel and said third storage carousel, said second transport mechanism for retrieving the media element transferred to the selected storage bin of the second storage carousel by said first transport mechanism and for transferring the media element to a selected storage bin of said third storage carousel.

18. The data storage and retrieval apparatus of claim 17 further comprising a media-element reader positioned between the first and second storage carousel.

\* \* \* \* \*